United States Patent [19]

Lafever

[11] Patent Number: 4,834,037
[45] Date of Patent: May 30, 1989

[54] UNITARY MOLDED PLASTIC VALVE SEAL

[75] Inventor: Edward E. Lafever, Hagerstown, Ind.

[73] Assignee: Dana Corporation, Toledo, Ohio

[21] Appl. No.: 108,494

[22] Filed: Oct. 14, 1987

[51] Int. Cl.⁴ .................... F01L 3/08; F16J 15/32; F16J 15/56

[52] U.S. Cl. .................. 123/188 P; 277/152; 277/189; 277/206 A; 277/212 C; 277/227; 277/DIG. 6

[58] Field of Search ............ 277/152, 206 A, 212 FB, 277/212 R, 212 F, 212 C, 208, 189, 184, DIG. 6, 227; 123/188 P; 251/214

[56] References Cited

U.S. PATENT DOCUMENTS

| | | |
|---|---|---|
| 511,734 | 12/1893 | Hoffstadt . |
| 1,336,030 | 4/1920 | Gammeter ................ 277/208 X |
| 2,489,715 | 11/1949 | Mark, Jr. et al. . |
| 2,821,973 | 2/1958 | Guhman ................ 123/188 P |
| 2,859,993 | 11/1958 | Estey . |
| 2,873,132 | 2/1959 | Tanner . |
| 2,906,255 | 9/1959 | Bunce . |
| 2,908,255 | 9/1959 | Bunce ................ 123/188 P |
| 2,973,744 | 3/1961 | Hennells ................ 91/394 X |
| 2,983,533 | 5/1961 | Tisch ................ 277/206 AX |
| 3,119,624 | 1/1964 | Freed ................ 277/208 X |
| 3,198,188 | 8/1965 | Heid, Jr. ................ 123/188 P |
| 3,326,562 | 6/1967 | Deuring . |
| 3,372,941 | 3/1968 | Liebig . |
| 3,480,286 | 11/1969 | Kosatka ................ 277/208 X |
| 3,601,420 | 8/1971 | Binford . |
| 3,699,942 | 10/1972 | Moray . |
| 3,885,546 | 5/1975 | Foley et al. . |
| 3,913,928 | 10/1975 | Yamaguchi . |
| 4,124,220 | 11/1978 | Leone et al. . |
| 4,125,265 | 11/1978 | Grzesiak ................ 277/152 |
| 4,309,063 | 1/1982 | Weis ................ 384/482 |
| 4,317,436 | 3/1982 | Barnhart et al. ........... 277/212 CX |
| 4,325,558 | 4/1982 | Poggio ................ 123/188 PX |
| 4,640,309 | 2/1987 | Hoffman et al. ........... 137/596.18 |
| 4,730,583 | 3/1988 | Stritzke ................ 123/188 P |

Primary Examiner—Allan N. Shoap
Attorney, Agent, or Firm—Willian Brinks Olds Hofer Gilson & Lione

[57] ABSTRACT

A unitary molded valve seal assembly includes a plastic body and an elastomeric seal which is molded in-situ within the plastic body. The plastic seal body preferably fabricated of Hytrel plastic and includes a plurality of obliquely oriented ribs or lips on its inside surface which seal against an engine valve guide. The elastomeric seal is preferably fabricated of Viton rubber and defines an irregular surface having curved regions which retain it within the seal body and a pair of spaced apart lips which sealingly engage the value stem.

20 Claims, 1 Drawing Sheet

UNITARY MOLDED PLASTIC VALVE SEAL

BACKGROUND OF THE INVENTION

The invention relates to internal combustion engine valve seals and more specifically to a unitary, i.e., one piece, molded plastic valve stem seal having an elastomeric seal integrally molded thereinto.

In conventional overhead valve internal combustion engines, a pair of valves reciprocate in timed alternation to provide intermittent communication between the intake and exhaust manifolds and a combustion chamber. Lubrication is provided to the upper portions of the valves by a spray of lubricating oil within the valve cover or gravity flow from the associated rocker arm. Oil then flows downwardly along the upper free end of the valve stem toward the valve head. Since temperatures in the combustion chamber may approach or exceed 1000 degrees Centigrade, any lubricating oil exposed to these temperatures will vaporize or burn leaving behind deposits which may interfere with the proper sealing of the valves and cause rapid deterioration thereof.

It is therefore necessary to provide seals generally between the upper region of the valve stems within the valve cover and the valve guide which extends toward the manifolds and combustion chamber. Such a typical valve stem seal takes the form of a cylinder partially closed at one end. The cylindrical region seats about the valve guide to maintain the valve seal stationary and the reduced diameter region slidingly seals against the valve stem.

Extensive effort has been directed to this internal combustion engine component and numerous designs, many of which are patented, are the result of such effort.

For example, many valve stem seals having generally cylindrical bodies of synthetic rubber, for example, Buna N and an annular seal of a distinct material which slidably engages the valve stem have been developed. The annular seal may be fabricated of diverse materials such as cast iron, a synthetic resin or a self-lubricating material such as a tetrafluoroethylene polymer (commercially sold under the trade name Teflon).

Another approach to a valve seal construction utilizes a nylon body with a silicone rubber valve stem engaging grommet which is retained in the seal body by a cooperating T-shaped flange and groove arrangement. Valve seals which comprehend the placement of annular ribs or grooves on the inside of the seal body which improve both the seal against the valve guide and the retention of the valve seal thereon are also known in the art.

The seal itself has also been the subject of design effort and various shapes have been developed for diverse, i.e. non-engine applications. One such design has an X cross section which is fabricated of a natural or synthetic rubber.

From the foregoing review of prior art patents, it is apparent that valve seals conventionally comprise individual body and seal components which typically must be assembled into a valve seal assembly. Such multiple components and associated assembly increases the cost of the units which are utilized in large numbers by internal combustion engine manufacturers. It is therefore apparent that improvements in the art of internal combustion engine valve stem seals are both possible and desireable.

SUMMARY OF THE INVENTION

The present invention relates to a unitary, i.e., one piece, valve seal assembly including a plastic body and an elastomeric seal which is integrally molded into the body. The valve seal body is preferably fabricated of a plastic having good high temperature strength and stability such as a polyester elastomer and similar plastics. The valve body includes a plurality of lips or ribs on its inside surface which seal against the valve guide. The integrally molded elastomeric seal is preferably fabricated of Viton rubber and defines an irregular X in cross section. That is, the elastomeric seal includes four convexly radiused curves defining the corners of the seal and three concavely curved regions interconnecting the convex corners. A pair of spaced-apart inwardly directed ribs engage the valve stem. The radii of the convexly curved corners is preferably approximately equal to the radii of the three concavely curved intermediate regions.

Objects and advantages of the present invention will become apparent by reference to the appended drawings and following description of the preferred embodiment wherein like reference numerals appearing in the various drawings represent the same feature or component of the invention.

DESCRIPTION OF THE PREFERRED EMBODIMENT

Figure 1:
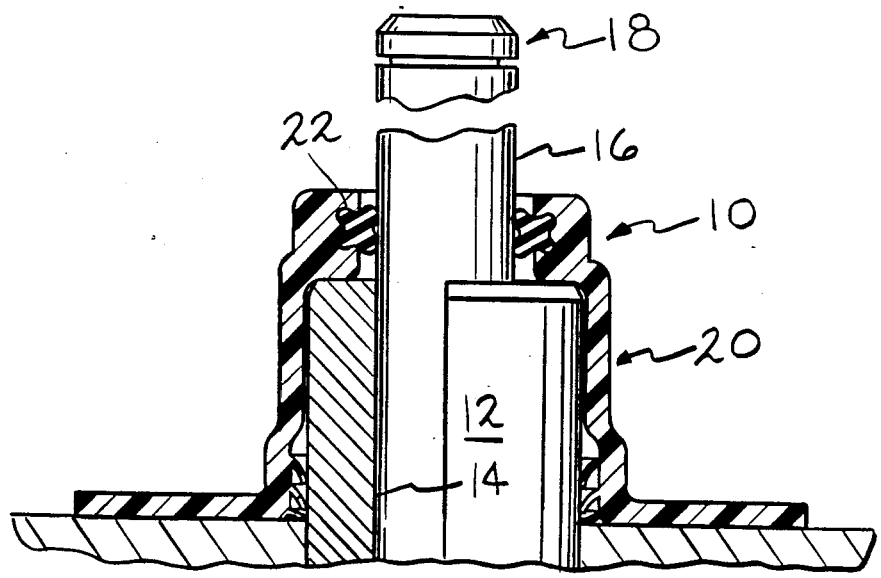
FIG. 1 is a fragmentary view in partial section of a valve stem, valve guide and unitary molded valve seal assembly according to the present invention.

Referring now to FIG. 1, a unitary, i.e., one piece, molded valve seal assembly is illustrated and designated by the reference numeral 10. The valve seal assembly 10 is illustrated mounted and secured in position upon a valve guide 12 of an internal combustion engine (not illustrated). As is well-known, the valve guide 12 defines a concentric through passageway 14 which slidably receives a stem 16 of an intake or exhaust valve 18. In accordance with conventional practice, the valve guide 12, the valve stem 16 and the valve seal assembly 10 are all circular when viewed in radial cross section.

Figure 2:
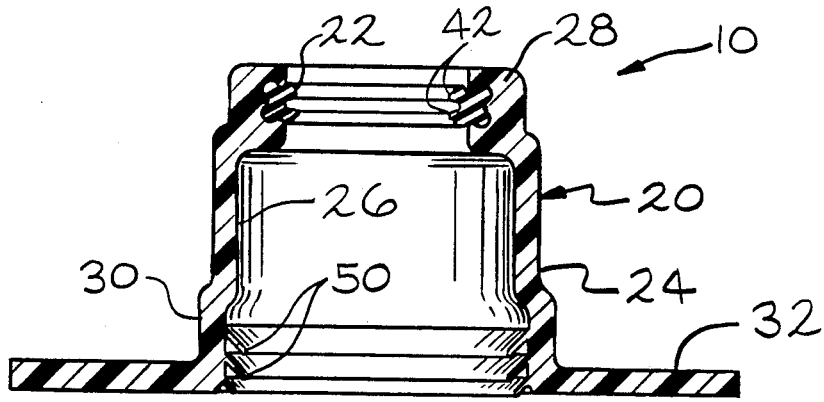
FIG. 2 is a full, sectional view with a unitary molded valve seal assembly according to the present invention.

Referring now to FIG. 2, the valve seal assembly 10 includes a molded plastic valve seal body 20 and an in-situ, i.e., integrally, molded elastomeric valve stem seal 22. The valve seal body 20 is generally of a top hat configuration and comprises a cylindrical body 24 which defines an inner cylindrical passageway 26, a reduced diameter region 28 adjacent one end, an enlarged diameter region 30 adjacent the opposite end and a thin, radially extending flange 32 adjacent the opposite end. A valve spring (not illustrated) seats against the upper surface of the flange 32 and maintains the valve seal assembly 10 in position on the engine head. Preferably, the diameter of the body 24 is approximately onehalf the diameter of the flange 32. The valve seal body 20 may be fabricated of a high temperature polyester elastomer having block copolymers of short chain diol terephthalate and long chain copolymers such as Hytrel which is a product and trademark of E. I. duPont de Nemours & Co. Similar polyester elastomer materials having good dimensional stability and service life at relatively elevated temperatures such as those encountered in the intended service environment of an internal combustion engine may also be utilized.

Figure 3:
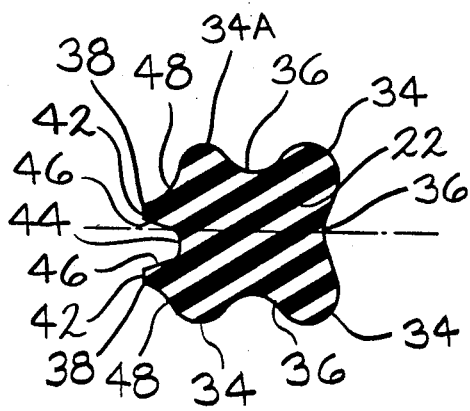
FIG. 3 is a full, sectional view of the elastomeric seal of a unitary molded valve seal assembly according to the present invention.

Referring now to FIGS. 2 and 3, the reduced diameter region 28 is integrally molded about and receives the elastomeric valve stem seal 22. The valve stem seal 22 is preferably fabricated of Viton or similar synthetic rubber or fluoroelastomer having suitable service characteristics such as durability at elevated temperatures. Viton is a trademark of E. I. duPont de Nemours & Co.

The valve stem seal 22 is an annulus having an irregular curvilinear X cross section as illustrated in FIG. 3. The surface of the valve stem seal 22 defines a plurality of convex surfaces 34, concave surfaces 36 and a pair of ribs 38. The convex surfaces 34 define the corners of the valve stem seal 22 and are preferably all of equal radii. The convex surface 34A has a slightly smaller radius. If, for example the radii of the convex surfaces 34 is 0.013 inches, the radius of the surface 34A may be 0.010 inches. Radii in the range of from 0.007 inches to 0.020 are appropriate. The alternating concave surfaces 36 are preferably approximately the same radius or slightly greater radius than that of the convex surfaces 34. Radii in the range of from 0.010 inches to 0.025 inches are thus appropriate.

The valve stem seal 22 also includes a pair of spaced-apart ribs 38 which are asymmetrical relative to, that is, offset from a horizontal reference midplane 40 of the seal 22 which is illustrated in FIG. 3. Each of the ribs 38 defines an annular surface 42 having a width of approximately 0.010 inches and preferably in the range of from 0.007 inches to 0.015 inches. A small radius concave surface 44 having a radius of approximately 0.005 inches and preferably in the range of from 0.003 inches to 0.008 inches merges with two surfaces inclined at an angle of approximately 18° to the horizontal references plane 40 and preferably about 15° to 20°. Concave surfaces 48 having a radius of approximately 0.012 inches to 0.020 inches connect the annular surfaces 42 with the convex surfaces 34 and 34A. Interference between the valve stem 16 and the annular surfaces 42 of the valve stem seal 22 is preferably in the range of from 0.010 to 0.018 inches and ideally about 0.014 inches in a valve seal application of typical size.

Figure 4:
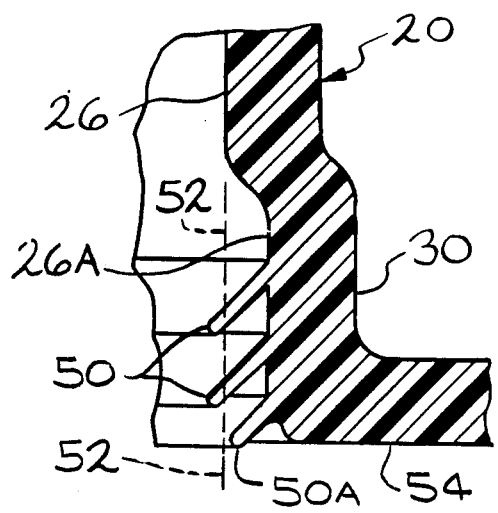
FIG. 4 is an enlarged, fragmentary sectional view of the internal lip or rib structure of a unitary molded valve seal assembly according to the present invention.

Referring now to FIGS. 2 and 4, it will be appreciated that within the enlarged diameter region 30 of the cylindrical passageway 26, the valve seal body 20 includes a plurality of inwardly extending ribs or lips 50. The lips 50 provide and maintain a substantially fluid impervious seal between the valve seal assembly 10 and the valve guide 12 thereby inhibiting the flow of lubricating oil through this annular region and the annular passageway between the valve guide 12 and the valve stem 16. Preferably, the lips 50 are at least three in number although more or fewer lips 50 may be utilized if desired. Likewise, all of the lips 50 are preferably oriented at an angle of approximately 45° although a larger or smaller acute angle may be utilized if desired. Typically, the lips 50 have a length of from 0.025 inches to 0.040 inches and a thickness of from 0.010 inches to 0.018 inches. Two of the lips 50 which are disposed axially away from the flange 32 extend (radially) approximately 0.004 inches to 0.010 inches beyond the inside diameter of the cylindrical passageway 26 indicated by the reference line 52. The lips 50 define an interference fit with the valve guide 12 as illustrated in FIG. 1 and deflect to provide a seal thereagainst. A third lip 50A extends obliquely beyond the lower face 54 of the flange 32 a distance of approximately 0.010 inches measured axially. Thus, this lip 50A likewise deflects as the valve seal assembly 10 is positioned on a valve guide 12 and the lip 50A seals against the valve guide 12 and associated engine head surfaces.

Thus, it will be appreciated that a unitary valve stem seal assembly according to the present invention provides an internal combustion engine component which responds to the requirements of conventional valve seals but which may be fabricated inexpensively by the in-situ or integral molding of the valve seal body 20 about the elastomeric valve stem seal 22 in a single injection molding operation. This single step molding eliminates the subsequent assembly operations which are common to many valve seal assemblies. Retention of the valve stem seal 22 within the valve seal body 20 is also excellent due to the shape of the valve stem seal 22 particularly that portion opposite the annular surfaces 42. The irregular X cross section valve stem seal 22, particularly the ribs 38 and the annular surfaces 42, provide exceptional sealing and service life performance and the annular flange 32 against which the valve spring seats provides quieter engine operation relative to designs in which the spring rests directly against the head of the associated internal combustion engine. Likewise, the obliquely oriented lips 50 and 50A sealingly engage the valve guide 12 and adjacent surface and inhibit the flow of engine oil between the valve seal assembly 10 and the valve guide 12.

The foregoing disclosure is the best mode devised by the inventor for practicing this invention. It is apparent, however, that apparatus incorporating modifications and variations will be obvious to one skilled in the art of internal combustion engine valve seals. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A unitary assembly for sealing a valve stem in an internal combustion engine comprising, in combination,
    a cylindrical body defining a through passageway having a surface and a radially extending flange adjacent one end, said body molded of a first, plastic material,
    an annular seal of a second, elastomeric material received within and secured to said body, said seal having a generally irregular cross section of four convex surfaces alternating with concave surfaces and two inwardly directed ribs defining two annular sealing surfaces, and
    at least one valve guide engaging circumferential lip on said surface of said through passageway adjacent said end.

2. The unitary valve seal assembly of claim 1 wherein said seal defines at least three concave surfaces.

3. The unitary valve seal assembly of claim 1 wherein said seal is fabricated of a fluoroelastomer.

4. The unitary valve seal assembly of claim 1 wherein said seal is fabricated of Viton fluoroelastomer.

5. The unitary valve seal assembly of claim 1 wherein said convex and concave surfaces have a radius of between about 0.007 and 0.025 inches.

6. The unitary valve seal assembly of claim 1 wherein said annular sealing surfaces have a width of between about 0.007 inches and 0.015 inches.

7. The unitary valve seal assembly of claim 1 wherein said circumferential lip is between about 0.025 inches and 0.040 inches in length and between about 0.010 inches and 0.018 inches in thickness.

8. The unitary valve seal assembly of claim 1 wherein said cylindrical body is fabricated of a high temperature polyester elastomer.

9. The unitary valve seal assembly of claim 1 wherein said cylindrical body is fabricated of Hytrel polyester elastomer.

10. The unitary valve seal assembly of claim 1 including at least three of said circumferential lips.

11. A unitary assembly for sealing a valve stem in an internal combustion engine comprising, in combination,
   a cylindrical body defining a through passageway having an inside surface and a radially extending flange adjacent one end of said body, said body molded of a first, plastic material,
   an annular seal received within and secured to said body, said seal having a generally irregular X-shaped cross section of four convex surfaces in alternation with three concave surfaces and two inwardly directed ribs defining two annular sealing surfaces and
   at least one valve guide engaging circumferential lip on said inside surface of said cylindrical body and proximate said end of said body.

12. The unitary valve seal assembly of claim 11 wherein said seal is fabricated of a fluoroelastomer.

13. The unitary valve seal assembly of claim 11 wherein said convex and concave surfaces have a radius of between about 0.007 and 0.025 inches.

14. The unitary valve seal assembly of claim 11 wherein said annular sealing surfaces have a width of between about 0.007 and 0.015 inches.

15. The unitary valve seal assembly of claim 11 wherein said circumferential ribs are between about 0.025 inches and 0.040 inches in length and between about 0.010 and 0.018 inches in thickness.

16. The unitary valve seal assembly of claim 11 wherein said cylindrical body is fabricated of a high temperature polyester elastomer.

17. The unitary valve seal assembly of claim 11 including at least three of said circumferential lips.

18. The unitary valve seal assembly of claim 11 wherein said circumferential lips are disposed in a region of enlarged inside diameter of said cylindrical body.

19. A unitary assembly for sealing a valve stem in an internal combustion engine comprising, in combination,
   a cylindrical body defining an axis, a through passageway along said axis having an inside surface defining a first region of larger diameter and a second region of smaller diameter and a radially extending flange adjacent said first region, said body molded of a polyester elastomer,
   an annular fluoroelastomer seal received within and secured by in-situ molding to said cylindrical body, said seal having an irregular X-shaped cross section of four convex surfaces in alternation with three concave surfaces and two inwardly directed, spaced-apart ribs defining two adjacent annular sealing surfaces and
   a plurality of valve guide engaging circumferential lips on said first region of larger diameter than said inside surface of said region oriented at an angle to said axis.

20. The unitary valve seal assembly of claim 19 wherein said annular sealing surfaces are of equal diameter.

* * * * *